(12) United States Patent
Pan

(10) Patent No.: US 7,886,792 B2
(45) Date of Patent: Feb. 15, 2011

(54) SHEET LAMINATING APPARATUS WITH JAMMING-DETECTION MECHANISM

(75) Inventor: Yung-Tai Pan, Taipei (TW)

(73) Assignee: Primax Electronics Ltd., Taipei (TW)

( * ) Notice: Subject to any disclaimer, the term of this patent is extended or adjusted under 35 U.S.C. 154(b) by 299 days.

(21) Appl. No.: 12/106,714

(22) Filed: Apr. 21, 2008

(65) Prior Publication Data

US 2009/0107631 A1    Apr. 30, 2009

(30) Foreign Application Priority Data

Oct. 26, 2007    (TW) .............................. 96140185 A

(51) Int. Cl.
*B32B 37/00* (2006.01)
*B32B 41/00* (2006.01)
*B65H 26/00* (2006.01)
*G05G 15/00* (2006.01)

(52) U.S. Cl. .................. 156/350; 156/64; 156/324; 156/351; 156/367; 156/368; 156/378

(58) Field of Classification Search ............... 492/9–11; 156/64, 307.7, 308.2, 308.4, 309.9, 324, 156/350, 351, 352, 358, 359, 361, 367, 368, 156/378
See application file for complete search history.

(56) References Cited

U.S. PATENT DOCUMENTS 5,653,846 A * 8/1997 Onodera et al. ............. 156/362
2006/0162841 A1 * 7/2006 Hong ........................... 156/64

OTHER PUBLICATIONS

McMillan, G.K.; Considine, D.M. (1999). Process/Industrial Instruments and Controls Handbook (5th Edition). McGraw-Hill.*

* cited by examiner

*Primary Examiner*—Khanh Nguyen
*Assistant Examiner*—Carson Gross
(74) *Attorney, Agent, or Firm*—Kirton & McConkie; Evan R. Witt

(57) ABSTRACT

The present invention provides a sheet laminating apparatus with a jamming-detection mechanism. A sensing element is disposed beside the roller for detecting whether a plastic film is adhered onto the roller during the laminating operation. When the jamming phenomenon occurs, the roller is reversely rotated to eject the jammed sheet article.

10 Claims, 3 Drawing Sheets

SHEET LAMINATING APPARATUS WITH JAMMING-DETECTION MECHANISM

FIELD OF THE INVENTION

The present invention relates to a sheet laminating apparatus, and more particularly to a sheet laminating apparatus with a jamming-detection mechanism.

BACKGROUND OF THE INVENTION

Conventionally, a valuable sheet article such as a paper sheet or a photograph is usually covered with a protective film for protection because such a sheet article is readily suffered from damage. Typically, a sheet laminating apparatus is used for laminating a sheet article between two pieces of protective films. The commercially available sheet laminating apparatuses are usually classified into several types. For illustration, a conventional sheet laminating apparatus is illustrated as follows with reference to FIGS. 1A and 1B.

Referring to FIG. 1A, a schematic cross-sectional view of a conventional sheet laminating apparatus is illustrated. The sheet laminating apparatus 10 of FIG. 1A principally comprises a transfer passage 101, a first roller 102A, a second roller 102B, a first heating unit 103A, a second heating unit 103B and a control unit (not shown). The transfer passage 101 includes an entrance zone 101A, a laminating zone 101B and an exit zone 101C. The first roller 102A and the second roller 102B are respectively disposed on the upper side and the lower side of the laminating zone 101B. When a sandwich structure of a sheet article 12 intervening between a first plastic film 11A and a second plastic film 11B is transported across the laminating zone 101B, the first roller 102A and the second roller 102B presses against opposite sides of the sandwich structure in order to laminate the sandwich structure. During the pressing operation implemented by the first roller 102A and the second roller 102B, the heat energy required to laminate the sandwich structure is offered by the first heating unit 103A and the second heating unit 103B, which are disposed beside the first roller 102A and the second roller 102B, respectively. Generally, the control unit includes a control circuit and a roller driving device for controlling operations of the first roller 102A and the second roller 102B. The roller driving device includes a motor, gear sets and other components for driving the rollers.

Please refer to FIG. 1A again. During operation of the sheet laminating apparatus 10, the first roller 102A is rotated in a first direction R1 and the second roller 102B is rotated in a second direction R2, wherein the first direction R1 is opposed to the second direction R2. As a consequence, a sandwich structure of a sheet article 12 (e.g. a paper sheet) intervening between a first plastic film 11A and a second plastic film 11B is transported through the entrance zone 101A of the transfer passage 101 to the laminating zone 101B. The sandwich structure is laminated in the laminating zone 100B to form a laminate structure, which is then ejected from the exit zone 101C. Meanwhile, the sheet article 12 is fixed between these two pieces of plastic films 12A and 12B.

During the laminating process, the heat generated by the first heating unit 103A and the second heating unit 103B will be transmitted to the first roller 102A and the second roller 102B to soften the first plastic film 11A and a second plastic film 11B and thus the sheet article 12 is fixed between these two pieces of plastic films 12A and 12B. In a case that either the first plastic film 11A is adhered to the first roller 102A or the second plastic film 11B is adhered to the second roller 102B, a so-called jamming phenomenon is resulted. For example, as shown in FIG. 1B, the first plastic film 11A is adhered to the first roller 102A during the laminating process to result in the jamming phenomenon. The conventional sheet laminating apparatus 10 lacks of a jamming-detection mechanism. Generally, the jamming phenomenon is subjectively realized if the laminate structure of the sheet article 12 and the plastic films 11A and 11B has not been ejected from the from the exit zone 101C in a predetermined time period. If the laminate structure is jammed in the transfer passage 101, the user may generally pull out the jammed sheet article by exerting a pulling force on the sheet article. If the problem of getting jammed is very serious, for example the laminate structure of the sheet article 12 and the plastic films 11A and 11B is jammed between the first roller 102A and the first heating unit 103A (or between the second roller 102B and the second heating unit 103B), the pulling force is usually insufficient to pull out the jammed sheet article. Under this circumstance, the sheet laminating apparatus may have an irrecoverable breakdown.

Therefore, there is a need of providing a sheet laminating apparatus having a mechanism for detecting the jamming phenomenon in real time, thereby effectively preventing the sheet laminating apparatus from being damaged by the jammed sheet article.

SUMMARY OF THE INVENTION

It is an object of the present invention to provide a sheet laminating apparatus with a jamming-detection mechanism, in which a sensing element is disposed beside the roller for detecting a jamming phenomenon and the roller is instantly reversed to eject the jammed sheet article according to the detecting result of the sensing element.

Another object of the present invention provides a method of detecting a jamming phenomenon of a sheet laminating apparatus. According to the difference between the rugged surface of the roller and the smooth surface of the plastic film, a sensing element is utilized to discriminate whether the plastic film is adhered onto the roller and a jamming phenomenon occurs.

In accordance with a first aspect of the present invention, there is provided a sheet laminating apparatus with a jamming-detection mechanism for laminating a sheet article between a first plastic film and a second plastic film. The sheet laminating apparatus includes a transfer passage, a first roller, a second roller, a first sensing element and a control unit. The transfer passage includes an entrance zone, a laminating zone and an exit zone. The first roller and the second roller are respectively disposed on an upper side and a lower side of the laminating zone. When the first roller is rotated in a first direction and the second roller is rotated in a second direction, the sheet article is laminated between the first plastic film and the second plastic film and transmitted from the laminating zone to the exit zone. When the first roller is rotated in the second direction and the second roller is rotated in the first direction, the first plastic film, the sheet article and the second plastic film are transmitted from the laminating zone to the entrance zone, in which the first direction is opposed to the second direction. The first sensing element is disposed between the laminating zone and the exit zone and beside the first roller and includes a first light source for generating a first light beam and a first light receiver. The first light beam is projected on the first roller if the first plastic film transported across the laminated zone is not adhered on the first roller. The first light beam is projected on and reflected by the second plastic film to generate a first reflective light beam if the first plastic film transported across the laminated zone is adhered on the first roller. The first reflective light beam is received by the first light receiver and converted into a first sensing signal. The control unit is electrically connected to the first sensing element for controlling the first roller to rotate in the second direction and controlling the second roller to rotate in the first direction in response to receipt of the first sensing signal.

In an embodiment, the sheet laminating apparatus further includes a second sensing element, which is disposed between the laminating zone and the exit zone and beside the second roller and includes a second light source for generating a second light beam and a second light receiver. The second light beam is projected on the second roller if the second plastic film transported across the laminated zone is not adhered on the second roller. The second light beam is projected on and reflected by the first plastic film to generate a second reflective light beam if the second plastic film transported across the laminated zone is adhered on the second roller. The second reflective light beam is received by the second light receiver and converted into a second sensing signal. The control unit is electrically to the second sensing element for controlling the first roller to rotate in the second direction and controlling the second roller to rotate in the first direction in response to receipt of the second sensing signal.

In an embodiment, the control unit includes a control circuit and a roller driving device.

In accordance with a second aspect of the present invention, there is provided a sheet laminating apparatus with a jamming-detection mechanism for laminating a sheet article between a first plastic film and a second plastic film. The sheet laminating apparatus includes a transfer passage, a first roller, a second roller, a first sensing element and a control unit. The transfer passage includes an entrance zone, a laminating zone and an exit zone. The first roller and the second roller are respectively disposed on an upper side and a lower side of the laminating zone. When the first roller is rotated in a first direction and the second roller is rotated in a second direction, the sheet article is laminated between the first plastic film and the second plastic film and transmitted from the laminating zone to the exit zone. When the first roller is rotated in the second direction and the second roller is rotated in the first direction, the first plastic film, the sheet article and the second plastic film are transmitted from the laminating zone to the entrance zone, in which the first direction is opposed to the second direction. The first sensing element is disposed between the laminating zone and the exit zone and beside the first roller and includes a first light source for generating a first light beam and a first light receiver. The first light beam is projected on and reflected by the first roller to generate a first reflective light beam if the first plastic film transported across the laminated zone is not adhered on the first roller. The first light beam is projected on and reflected by the second plastic film to generate a second reflective light beam if the first plastic film transported across the laminated zone is adhered on the first roller. The first reflective light beam and the second reflective light beam are received by the first light receiver and converted into a first sensing signal and a second sensing signal, respectively. The control unit is electrically connected to the first sensing element for controlling the first roller to rotate in the second direction and controlling the second roller to rotate in the first direction in response to receipt of the second sensing signal.

In an embodiment, the light intensity of the second reflective light beam is greater than that of the first reflective light beam.

In an embodiment, the sheet laminating apparatus further includes a second sensing element, which is disposed between the laminating zone and the exit zone and beside the second roller and includes a second light source for generating a second light beam and a second light receiver. The second light source is projected on and reflected by the second roller to generate a third reflective light beam if the second plastic film transported across the laminated zone is not adhered on the second roller. The second light beam is projected on and reflected by the first plastic film to generate a fourth reflective light beam if the second plastic film transported across the laminated zone is adhered on the second roller. The third reflective light beam and the fourth reflective light beam are received by the second light receiver and converted into a third sensing signal and a fourth sensing signal, respectively. The control unit is electrically to the second sensing element for controlling the first roller to rotate in the second direction and controlling the second roller to rotate in the first direction in response to receipt of the fourth sensing signal.

In an embodiment, the control unit includes a control circuit and a roller driving device.

In an embodiment, the light intensity of the fourth reflective light beam is greater than that of the third reflective light beam.

In accordance with a third aspect of the present invention, there is provided a method of detecting a jamming phenomenon of a sheet laminating apparatus. The sheet laminating apparatus includes at least one roller for laminating a sheet article between a first plastic film and a second plastic film. The method includes steps of emitting a light beam from a light source and projecting the light beam onto the roller; receiving a reflective light beam reflected from a surface of the second plastic film by the light receiver; and discriminating that the first film has been adhered on the roller if the reflective light beam is received by the light receiver.

In accordance with a fourth aspect of the present invention, there is provided a method of detecting a jamming phenomenon of a sheet laminating apparatus. The sheet laminating apparatus includes at least one roller for laminating a sheet article between a first plastic film and a second plastic film. The method includes steps of emitting a light beam from a light source and projecting the light beam onto the roller; receiving a first reflective light beam reflected from the roller or a second reflective light beam reflected from a surface of the second plastic film by the light receiver, wherein the light intensity of the second reflective light beam is greater than that of the first reflective light beam; discriminating that the first film is adhered on the roller if the first reflective light beam is received by the light receiver; and discriminating that the first film has been adhered on the roller if the second reflective light beam is received by the light receiver; and The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

For obviating the drawbacks encountered from the conventional a sheet laminating apparatus, the present invention provides a sheet laminating apparatus having a jamming-detection mechanism for detecting whether any plastic film is adhered to the roller of the sheet laminating apparatus. In a case that a jamming phenomenon occurs, the roller of the sheet laminating apparatus is reversely rotated to reject the sheet article and the plastic films being laminated.

Figure 1A:
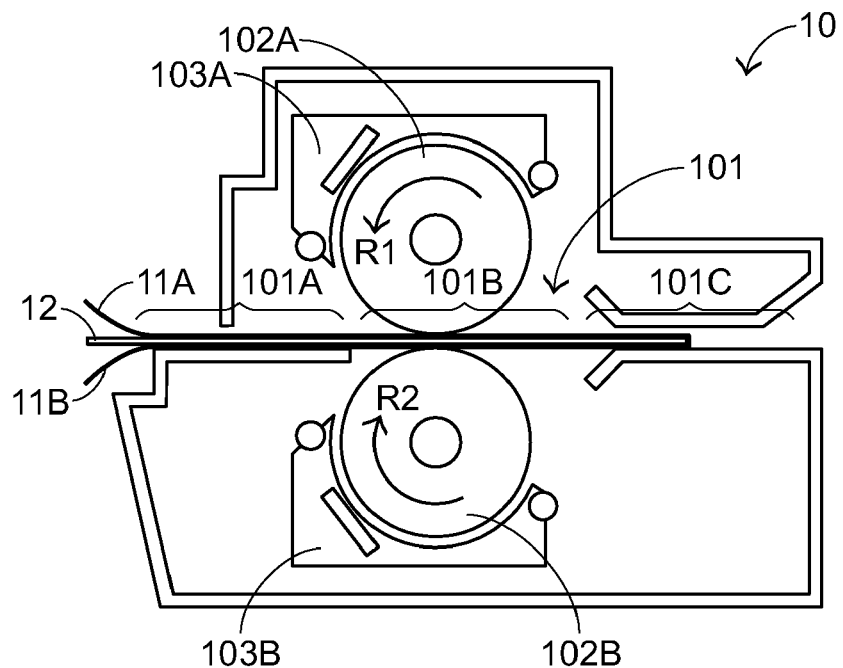
FIG. 1A is a schematic cross-sectional view illustrating a conventional sheet laminating apparatus.
Figure 1B:
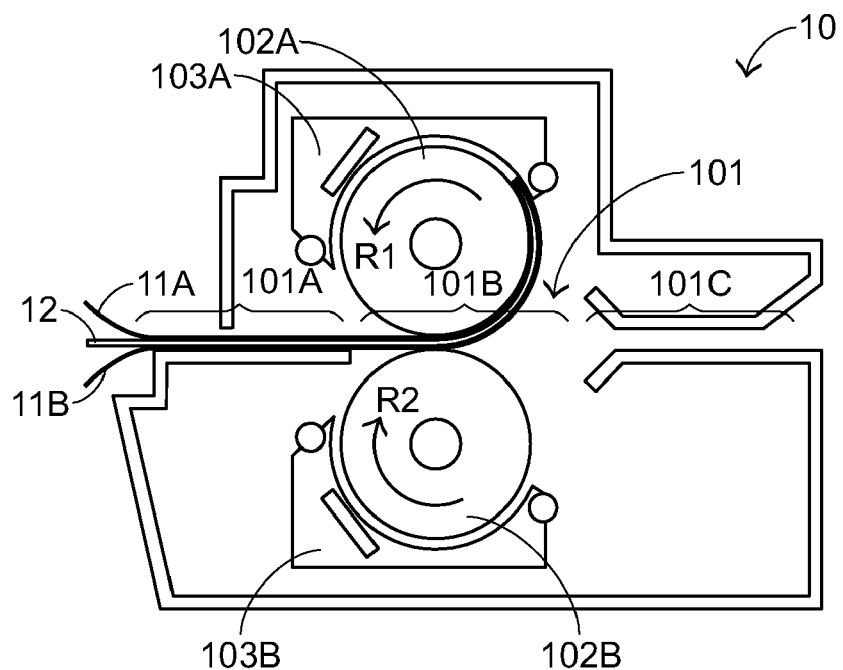
FIG. 1B is a schematic cross-sectional view illustrating occurrence of a jamming phenomenon in a conventional sheet laminating apparatus.
Figure 2:
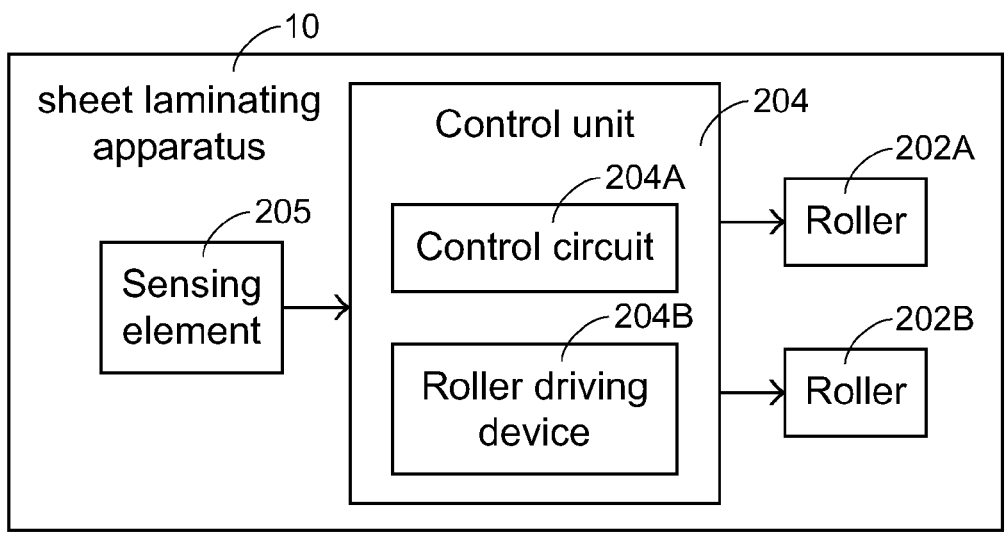
FIG. 2 is a schematic functional block diagram illustrating a sheet laminating apparatus according to the present invention.

FIG. 2 is a schematic functional block diagram illustrating a sheet laminating apparatus according to the present invention. The sheet laminating apparatus 20 principally includes a first roller 202A, a second roller 202B, a control unit 204 and a sensing element 205. The control unit 204 includes a control circuit 204A and a roller driving device 204B. According to the detecting result obtained by the sensing element 205, the first roller 202A and the second roller 202B are operated under the control of the control unit 204. The sensing element 205 is electrically connected to the control unit 204 for detecting whether either a first plastic film 21A is adhered to the first roller 202A or a second plastic film 21B is adhered to the second roller 202B during the laminating operation. The detecting result will be sent from the sensing element 205 to the control unit 204. According to the detecting result obtained by the sensing element 205, the control unit 204 may determine whether the laminating operation is continuously performed or terminated. While the laminating operation is terminated, the first roller 202A and the second roller 202B of the sheet laminating apparatus are reversely rotated such that the first plastic film 21A, the sheet article 22 and the second plastic film 21B are withdrawn from the sheet laminating apparatus 20.

Figure 3A:
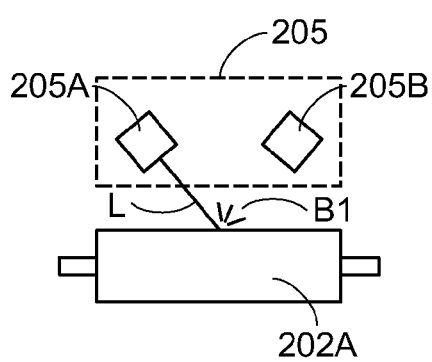
FIGS. 3A and 3B are schematic views illustrating operation principles of an exemplary jamming-detection mechanism of the sheet laminating apparatus according to the present invention.
Figure 3B:
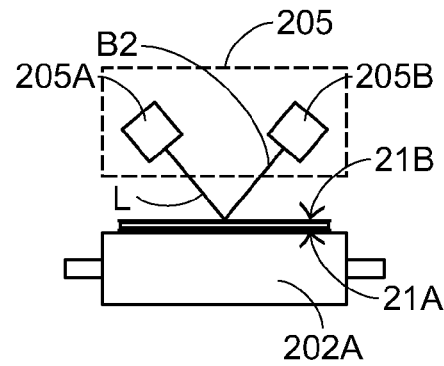

FIGS. 3A and 3B are schematic views illustrating operation principles of an exemplary jamming-detection mechanism of the sheet laminating apparatus according to the present invention. In this embodiment, the sensing element 205 is arranged beside the first roller 202A. For example, the sensing element 205 is an optical sensor and includes a light source 205A and a light receiver 205B.

As shown in FIG. 3A, the first plastic film 21A is not adhered to the first roller 202A. A light beam L emitted from the light source 205A is projected on the surface of the first roller 202A. Since the surface of the first roller 202A is rugged, the intensity of a first reflective light beam B1 reflected from the surface of the first roller 202A is insufficient to be received by the light receiver 205B. In other words, the first reflective light beam B1 fails to be converted into a sensing signal to be transmitted to the control unit. Under this circumstance, the control unit discriminates that no jamming phenomenon occurs and thus the laminating operation is continued.

As shown in FIG. 3B, the first plastic film 21A is adhered to the first roller 202A. A light beam L emitted from the light source 205A is projected on the surface of the second plastic film 21B. Since the surface of the second plastic film 21B is relatively smooth, the intensity of a second reflective light beam B2 reflected from the surface of the second plastic film 21B is sufficient to be received by the light receiver 205B. In other words, the second reflective light beam B2 is converted into a sensing signal, which is then transmitted to the control unit. Under this circumstance, the control unit discriminates that a jamming phenomenon occurs and thus the laminating operation is terminated. While the laminating operation is terminated, the first roller 202A and the second roller 202B of the sheet laminating apparatus are reversely rotated such that the first plastic film 21A, the sheet article 22 and the second plastic film 21B are withdrawn from the sheet laminating apparatus 20.

Figure 4A:
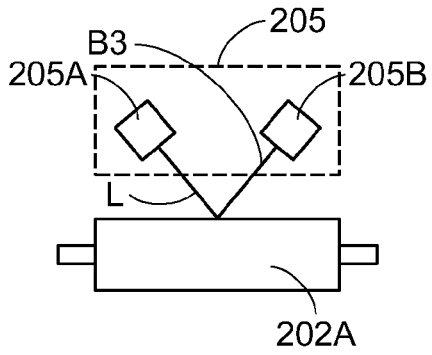
FIGS. 4A and 4B are schematic views illustrating operation principles of another exemplary jamming-detection mechanism of the sheet laminating apparatus according to the present invention.
Figure 4B:
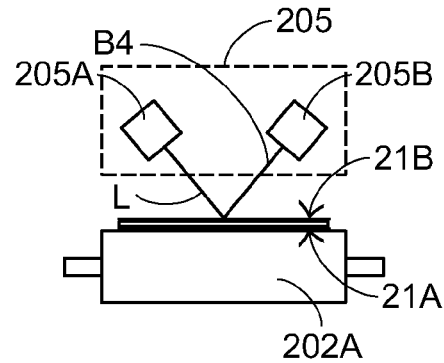

FIGS. 4A and 4B are schematic views illustrating operation principles of another exemplary jamming-detection mechanism of the sheet laminating apparatus according to the present invention. In this embodiment, the sensing element 205 is arranged beside the first roller 202A. For example, the sensing element 205 is also an optical sensor including a light source 205A and a light receiver 205B.

As shown in FIG. 4A, the first plastic film 21A is not adhered to the first roller 202A. A light beam L emitted from the light source 205A is projected on the surface of the first roller 202A. Since the surface of the first roller 202A is rugged, a third reflective light beam B3 with a relatively lower light intensity is reflected from the surface of the first roller 202A and received by the light receiver 205B. The third reflective light beam B3 is converted into a first sensing signal to be transmitted to the control unit. As shown in FIG. 4B, the first plastic film 21A is adhered to the first roller 202A. A light beam L emitted from the light source 205A is projected on the surface of the second plastic film 21B. Since the surface of the second plastic film 21B is relatively smooth, a fourth reflective light beam B4 with a relatively higher light intensity is reflected from the surface of the second plastic film 21B and received by the light receiver 205B. The fourth reflective light beam B4 is converted into a second sensing signal to be transmitted to the control unit.

Since the light intensity of the third reflective light beam B3 is greater than that of the fourth reflective light beam B4, the first sensing signal and the second sensing signal generated from the light receiver 205B are distinguishable. In other words, in a case that the first sensing signal issued from the light receiver 205B is transmitted to the control unit, the control unit discriminates that no jamming phenomenon occurs and thus the laminating operation is continued. In another case that the second sensing signal issued from the light receiver 205B is transmitted to the control unit, the control unit discriminates that a jamming phenomenon occurs and thus the laminating operation is terminated. While the laminating operation is terminated, the first roller 202A and the second roller 202B of the sheet laminating apparatus are reversely rotated such that the first plastic film 21A, the sheet article 22 and the second plastic film 21B are withdrawn from the sheet laminating apparatus 20.

Figure 5A:
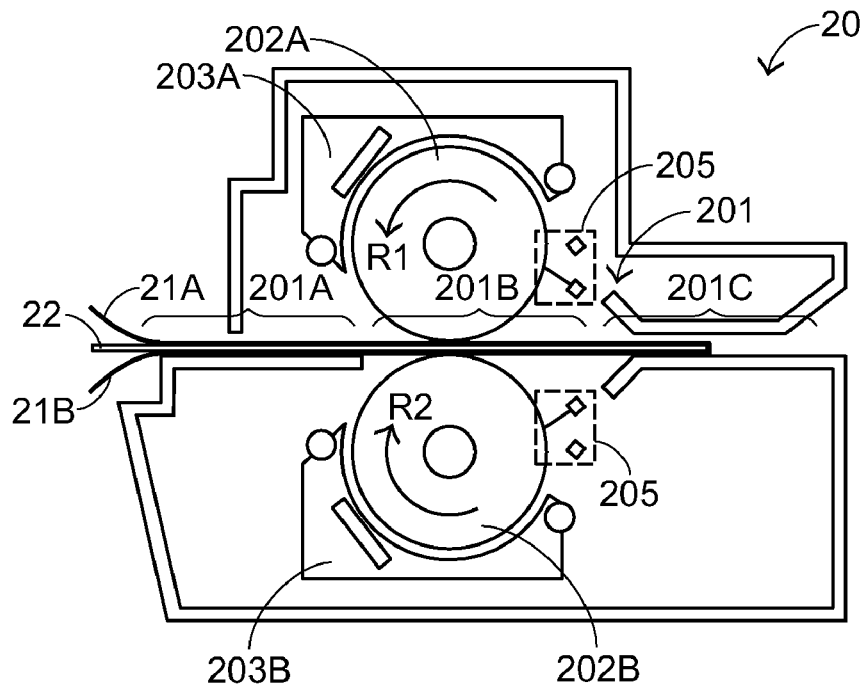
FIGS. 5A and 5B are schematic cross-sectional views illustrating a sheet laminating apparatus with a jamming-detection mechanism according to the present invention.
Figure 5B:
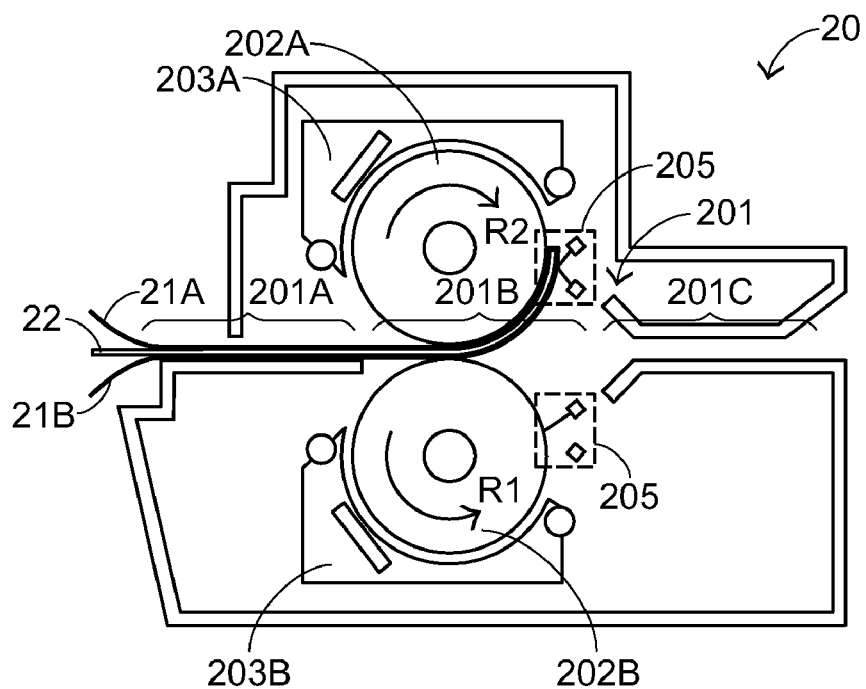

FIGS. 5A and 5B are schematic cross-sectional views illustrating a sheet laminating apparatus with a jamming-detection mechanism according to the present invention. The sheet laminating apparatus 20 is used for laminating a first plastic film 21A, a sheet article 22 and a second plastic film 21B. The sheet laminating apparatus 20 of FIG. 5 principally comprises a transfer passage 201, a first roller 202A, a second roller 202B, a first heating unit 203A, a second heating unit 203B and a control unit 204 (as shown in FIG. 2). The transfer passage 201 includes an entrance zone 201A, a laminating zone 201B and an exit zone 201C. The first roller 202A and the second roller 202B are respectively disposed on the upper side and the lower side of the laminating zone 201B. When a sandwich structure of a sheet article 22 intervening between the first plastic film 21A and the second plastic film 21B is transported across the laminating zone 201B, the first roller 202A and the second roller 202B presses against opposite sides of the sandwich structure in order to laminate the sandwich structure. During the pressing operation implemented by the first roller 202A and the second roller 202B, the heat energy required to laminate the sandwich structure is offered by the first heating unit 203A and the second heating unit 203B, which are disposed beside the first roller 202A and the second roller 202B, respectively. In accordance with a key feature of the present invention, only one sensing element 205 is disposed between the laminating zone 201B and the exit zone 201C and arranged beside the first roller 202A or the second roller 202B. Alternatively, two sensing elements 205 are disposed between the laminating zone 201B and the exit zone 201C and respectively arranged beside the first roller 202A and the second roller 202B.

Hereinafter, a process for laminating a sheet article between two plastic films by using the sheet laminating apparatus 20 of the present invention will be described with reference to FIGS. 5A and 5B.

First of all, as shown in FIG. 5A, the first roller 202A is rotated in a first direction R1 and the second roller 202B is rotated in a second direction R2, wherein the first direction R1 is opposed to the second direction R2. As a consequence, a sandwich structure of a sheet article 22 (e.g. a paper sheet or a photograph) intervening between a first plastic film 21A and a second plastic film 21B is transported through the entrance zone 201A of the transfer passage 201 to the laminating zone 201B. The sandwich structure is laminated in the laminating zone 201B to form a laminate structure, which is ejected from the exit zone 201C. Meanwhile, the sheet article 22 is fixed between these two pieces of plastic films 22A and 22B. During the laminating operation, the sensing element 205 beside the first roller 202A or the second roller 202B will detect whether the first plastic film 21A or the second plastic film 21B transported across the laminating zone 201B is adhered on the first roller 202A or the second roller 202B (i.e. the occurrence of the jamming phenomenon). In a case that either the first plastic film 21A is adhered to the first roller 202A or the second plastic film 21B is adhered to the second roller 202B, the jamming phenomenon occurs. For example, as shown in FIG. 2B, the first plastic film 21A is adhered to the first roller 102A during the laminating process to result in the jamming phenomenon. Under this circumstance, the sensing signal will be transmitted from the sensing element 205 to the control unit (as shown in FIG. 2). In response to the sensing signal transmitted from the sensing element 205, the laminating operation is terminated under the control of the control unit. While the laminating operation is terminated, the first roller 202A is rotated in the second direction R2 and the second roller 202B is rotated in the first direction R1 such that the first plastic film 21A, the sheet article 22 and the second plastic film 21B are transported from the laminating zone 201B to the entrance zone 201A. As a result, the jamming phenomenon is obviated.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A sheet laminating apparatus with a jamming-detection mechanism for laminating a sheet article between a first plastic film and a second plastic film, said sheet laminating apparatus comprising:

a transfer passage including an entrance zone, a laminating zone and an exit zone;

a first roller and a second roller respectively disposed on an upper side and a lower side of said laminating zone, wherein said sheet article is laminated between said first plastic film and said second plastic film and transmitted from said laminating zone to said exit zone when said first roller is rotated in a first direction and said second roller is rotated in a second direction, and said first plastic film, said sheet article and said second plastic film are transmitted from said laminating zone to said entrance zone when said first roller is rotated in said second direction and said second roller is rotated in said first direction, in which said first direction is opposed to said second direction;

a first sensing element disposed between said laminating zone and said exit zone and beside said first roller and including a first light source for generating a first light beam and a first light receiver, wherein said first light beam is projected on said first roller if said first plastic film transported across said laminated zone is not adhered on said first roller, and said first light beam is projected on and reflected by said second plastic film to generate a first reflective light beam if said first plastic film transported across said laminated zone is adhered on said first roller, wherein said first reflective light beam is received by said first light receiver and converted into a first sensing signal; and a control unit electrically connected to said first sensing element for controlling said first roller to rotate in said second direction and controlling said second roller to rotate in said first direction in response to receipt of said first sensing signal.

2. The sheet laminating apparatus with a jamming-detection mechanism according to claim 1 wherein said control unit includes a control circuit and a roller driving device.

3. The sheet laminating apparatus with a jamming-detection mechanism according to claim 1 further including a second sensing element, which is disposed between said laminating zone and said exit zone and beside said second roller and includes a second light source for generating a second light beam and a second light receiver, wherein said second light source is projected on said second roller if said second plastic film transported across said laminated zone is not adhered on said second roller, and said second light beam is projected on and reflected by said first plastic film to generate a second reflective light beam if said second plastic film transported across said laminated zone is adhered on said second roller, wherein said second reflective light beam is received by said second light receiver and converted into a second sensing signal, wherein said control unit is electrically to said second sensing element for controlling said first roller to rotate in said second direction and controlling said second roller to rotate in said first direction in response to receipt of said second sensing signal.

4. The sheet laminating apparatus with a jamming-detection mechanism according to claim 3 wherein said control unit includes a control circuit and a roller driving device.

5. A sheet laminating apparatus with a jamming-detection mechanism for laminating a sheet article between a first plastic film and a second plastic film, said sheet laminating apparatus comprising:

a transfer passage including an entrance zone, a laminating zone and an exit zone;

a first roller and a second roller respectively disposed on an upper side and a lower side of said laminating zone, wherein said sheet article is laminated between said first plastic film and said second plastic film and transmitted from said laminating zone to said exit zone when said first roller is rotated in a first direction and said second roller is rotated in a second direction, and said first plastic film, said sheet article and said second plastic film are transmitted from said laminating zone to said entrance zone when said first roller is rotated in said second direction and said second roller is rotated in said first direction, in which said first direction is opposed to said second direction;

a first sensing element disposed between said laminating zone and said exit zone and beside said first roller and including a first light source for generating a first light beam and a first light receiver, wherein said first light beam is projected on and reflected by said first roller to generate a first reflective light beam if said first plastic film transported across said laminated zone is not adhered on said first roller, and said first light beam is projected on and reflected by said second plastic film to generate a second reflective light beam if said first plastic film transported across said laminated zone is adhered on said first roller, wherein said first reflective light beam and said second reflective light beam are received by said first light receiver and converted into a first sensing signal and a second sensing signal, respectively; and a control unit electrically connected to said first sensing element for controlling said first roller to rotate in said second direction and controlling said second roller to rotate in said first direction in response to receipt of said second sensing signal.

6. The sheet laminating apparatus with a jamming-detection mechanism according to claim 5 wherein said control unit includes a control circuit and a roller driving device.

7. The sheet laminating apparatus with a jamming-detection mechanism according to claim 5 wherein the light intensity of said second reflective light beam is greater than that of said first reflective light beam.

8. The sheet laminating apparatus with a jamming-detection mechanism according to claim 5 further including a second sensing element, which is disposed between said laminating zone and said exit zone and beside said second roller and includes a second light source for generating a second light beam and a second light receiver, wherein said second light source is projected on and reflected by said second roller to generate a third reflective light beam if said second plastic film transported across said laminated zone is not adhered on said second roller, and said second light beam is projected on and reflected by said first plastic film to generate a fourth reflective light beam if said second plastic film transported across said laminated zone is adhered on said second roller, wherein said third reflective light beam and said fourth reflective light beam are received by said second light receiver and converted into a third sensing signal and a fourth sensing signal, respectively, wherein said control unit is electrically to said second sensing element for controlling said first roller to rotate in said second direction and controlling said second roller to rotate in said first direction in response to receipt of said fourth sensing signal.

9. The sheet laminating apparatus with a jamming-detection mechanism according to claim 8 wherein said control unit includes a control circuit and a roller driving device.

10. The sheet laminating apparatus with a jamming-detection mechanism according to claim 8 wherein the light intensity of said fourth reflective light beam is greater than that of said third reflective light beam.

* * * * *